United States Patent
Deng et al.

(10) Patent No.: US 9,007,647 B2
(45) Date of Patent: Apr. 14, 2015

(54) METHODS AND APPARATUS TO IDENTIFY IMAGES IN PRINT ADVERTISEMENTS

(71) Applicants: Kevin Keqiang Deng, Safety Harbor, FL (US); Alan Nguyen Bosworth, Austin, TX (US)

(72) Inventors: Kevin Keqiang Deng, Safety Harbor, FL (US); Alan Nguyen Bosworth, Austin, TX (US)

(73) Assignee: The Nielsen Company (US), LLC, Schaumburg, IL (US)

(*) Notice: Subject to any disclaimer, the term of this patent is extended or adjusted under 35 U.S.C. 154(b) by 0 days.

(21) Appl. No.: 13/721,887

(22) Filed: Dec. 20, 2012

(65) Prior Publication Data

US 2013/0114907 A1    May 9, 2013

Related U.S. Application Data

(63) Continuation of application No. 11/855,768, filed on Sep. 14, 2007, now Pat. No. 8,368,918.

(60) Provisional application No. 60/825,769, filed on Sep. 15, 2006.

(51) Int. Cl.
| | |
|---|---|
| G06K 15/00 | (2006.01) |
| G06K 9/46 | (2006.01) |
| G06K 9/48 | (2006.01) |
| G06F 7/00 | (2006.01) |
| G06F 17/00 | (2006.01) |
| G06K 9/62 | (2006.01) |
| G06F 17/30 | (2006.01) |

(52) U.S. Cl.
CPC ............ *G06K 9/62* (2013.01); *G06F 17/30247* (2013.01); *G06F 17/30011* (2013.01); *G06F 17/30259* (2013.01); *G06F 17/30244* (2013.01); *G06F 17/30256* (2013.01)

(58) Field of Classification Search
CPC combination set(s) only.
See application file for complete search history.

(56) References Cited

U.S. PATENT DOCUMENTS

| | | | |
|---|---|---|---|
| 5,606,690 | A | 2/1997 | Hunter et al. |
| 5,845,278 | A | 12/1998 | Kirsch et al. |
| 5,852,823 | A | 12/1998 | De Bonet |
| 5,855,015 | A | 12/1998 | Shoham |
| 5,862,260 | A | 1/1999 | Rhoads |
| 5,895,470 | A | 4/1999 | Pirolli et al. |

(Continued)

FOREIGN PATENT DOCUMENTS

| | | |
|---|---|---|
| GB | 2040129 | 8/1980 |
| GB | 2330930 | 5/1999 |
| WO | 9967695 | 12/1999 |

OTHER PUBLICATIONS

Examination Report under Section 18(3), issued by the Intellectual Property Office of Great Britain in connection with application No. GB0904722.6, on Dec. 9, 2010, 4 pages.

(Continued)

*Primary Examiner* — Richard Z. Zhu

(74) *Attorney, Agent, or Firm* — Hanley, Flight & Zimmerman, LLC

(57) ABSTRACT

Methods and apparatus to methods and apparatus to identify images in print advertisements are disclosed. An example method comprises computing a first image feature vector for a first presented image, comparing the first image feature vector to a second image feature vector, and when the first image feature vector matches the second image feature vector, storing printed-media information associated with the first presented image in a database record associated with the second image feature vector.

28 Claims, 8 Drawing Sheets

(56) References Cited

U.S. PATENT DOCUMENTS

| | | | |
|---|---|---|---|
| 5,915,250 A | | 6/1999 | Jain et al. |
| 5,933,823 A | * | 8/1999 | Cullen et al. ............................ 1/1 |
| 5,995,978 A | | 11/1999 | Cullen et al. |
| 6,018,735 A | | 1/2000 | Hunter |
| 6,084,595 A | | 7/2000 | Bach et al. |
| 6,269,362 B1 | | 7/2001 | Broder et al. |
| 6,285,995 B1 | | 9/2001 | Abdel-Mottaleb et al. |
| 6,327,388 B1 | * | 12/2001 | Zhou et al. ..................... 382/204 |
| 6,356,903 B1 | | 3/2002 | Baxter et al. |
| 6,366,904 B1 | | 4/2002 | BenHadda et al. |
| 6,426,806 B2 | | 7/2002 | Melen |
| 6,442,284 B1 | | 8/2002 | Gustafson et al. |
| 6,512,837 B1 | | 1/2003 | Ahmed |
| 6,594,383 B1 | * | 7/2003 | Syeda-Mahmood ......... 382/162 |
| 6,792,164 B2 | * | 9/2004 | Syeda-Mahmood ......... 382/305 |
| 6,941,321 B2 | | 9/2005 | Schuetze et al. |
| 6,950,519 B2 | | 9/2005 | Rhoads |
| 6,993,517 B2 | | 1/2006 | Naito et al. |
| 7,145,699 B2 | * | 12/2006 | Dolan ........................... 358/452 |
| 7,283,650 B1 | | 10/2007 | Sharma et al. |
| 7,539,657 B1 | | 5/2009 | Liu et al. |
| 7,551,755 B1 | | 6/2009 | Steinberg et al. |
| 2002/0067857 A1 | * | 6/2002 | Hartmann et al. ............ 382/224 |
| 2002/0164078 A1 | | 11/2002 | Uehara et al. |
| 2003/0112997 A1 | | 6/2003 | Ahmed |
| 2004/0181525 A1 | | 9/2004 | Itzhak et al. |
| 2004/0218837 A1 | | 11/2004 | Shiyama |
| 2005/0232478 A1 | | 10/2005 | Onishi et al. |
| 2005/0267872 A1 | | 12/2005 | Galai et al. |
| 2006/0085815 A1 | | 4/2006 | Nguyen-Tran |
| 2006/0112095 A1 | * | 5/2006 | Xie et al. ........................... 707/5 |
| 2006/0153296 A1 | | 7/2006 | Deng |
| 2006/0247983 A1 | | 11/2006 | Dalli |
| 2006/0253491 A1 | | 11/2006 | Gokturk et al. |
| 2007/0016918 A1 | | 1/2007 | Alcorn et al. |
| 2007/0019864 A1 | * | 1/2007 | Koyama et al. ............... 382/218 |
| 2007/0022005 A1 | | 1/2007 | Hanna |
| 2007/0110275 A1 | | 5/2007 | Rhoads et al. |
| 2007/0157224 A1 | | 7/2007 | Pouliot et al. |
| 2012/0095837 A1 | | 4/2012 | Bharat et al. |

OTHER PUBLICATIONS

Examination Report under Section 18(3), issued by the Intellectual Property Office of Great Britain in connection with application No. GB0904722.6, on May 16, 2011, 5 pages.

Examination Report under Section 18(3), issued by the Intellectual Property Office of Great Britain in connection with application No. GB0904722.6, on Oct. 11, 2011, 4 pages.

Examiner's First Report, issued by the Australian Intellectual Property Office in connection with application No. 2007296443, on Jan. 25, 2011, 1 page.

Written Opinion and International Search Report of the International Searching Authority, issued by the International Searching Authority in connection with application No. PCT/US2007/078401, on Feb. 19, 2008, 11 pages.

Office action, issued by the United States Patent and Trademark Office in connection with U.S. Appl. No. 11/855,768, filed Jul. 30, 2010, 16 pages.

Final rejection, issued by the United States Patent and Trademark Office in connection with U.S. Appl. No. 11/855,768, filed Dec. 10, 2010, 14 pages.

Office action, issued by the United States Patent and Trademark Office in connection with U.S. Appl. No. 11/855,768, filed Sep. 27, 2011, 19 pages.

Final rejection, issued by the United States Patent and Trademark Office in connection with U.S. Appl. No. 11/855,768, filed Mar. 8, 2012, 15 pages.

Advisory action, issued by the United States Patent and Trademark Office in connection with U.S. Appl. No. 11/855,768, filed May 22, 2012, 5 pages.

Notice of Allowance and Fee(s) Due, issued by the United States Patent and Trademark Office in connection with U.S. Appl. No. 11/855,768, filed Nov. 20, 2012, 9 pages.

Notice of Allowability, issued by the United States Patent and Trademark Office in connection with U.S. Appl. No. 11/855,768, filed Jan. 8, 2013, 3 pages.

Traina et al., "Using an image-extended relational database to support content-based image retrieval in a PACS," Computer Methods and Programs in Biomedicine, 80 Suppl. 1, 2005, 13 pages.

International Preliminary Report on Patentability, issued by the International Bureau of WIPO in connection with application No. PCT/US2007/078401, on Mar. 17, 2009, 7 pages.

\* cited by examiner

METHODS AND APPARATUS TO IDENTIFY IMAGES IN PRINT ADVERTISEMENTS

RELATED APPLICATIONS

This patent arises from a continuation of U.S. patent application Ser. No. 11/855,768, entitled "Methods and Apparatus to Identify Images in Print Advertisements," and filed on Sep. 14, 2007, which claims benefit of U.S. Provisional Application Ser. No. 60/825,769, entitled "Methods and Apparatus for Image Identification in Print Advertisements," and filed on Sep. 15, 2006. U.S. patent application Ser. No. 11/855,768 and U.S. Provisional Application Ser. No. 60/825,769 are hereby incorporated by reference in their entireties.

FIELD OF THE DISCLOSURE

This disclosure relates generally to print advertisements, and, more particularly, to methods and apparatus to identify images in print advertisements.

BACKGROUND

Manufacturers, advertisers and/or publishers frequently place advertisements in printed media (e.g., magazines, newspapers, etc.). With the advent of the Internet, there is more competition for the advertisement budgets of these entities. Moreover, manufacturers and/or advertisers are also interested competitive and/or comparative research.

DETAILED DESCRIPTION

Figure 1:
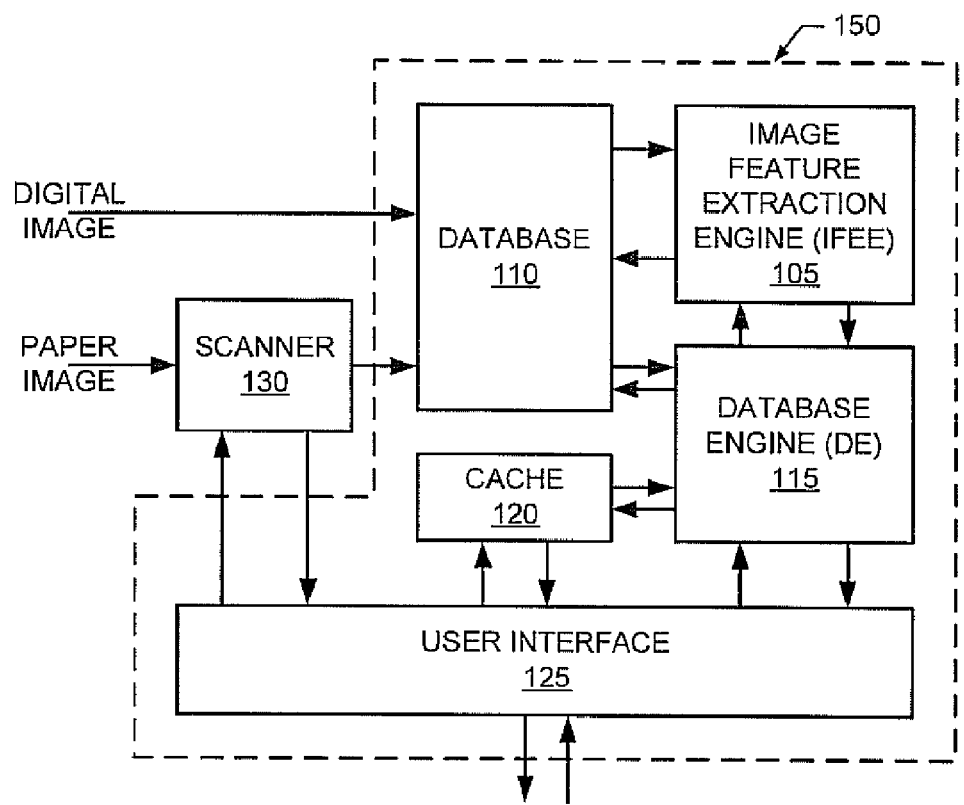
FIG. 1 is a schematic illustration of an example image identification system constructed in accordance with the teachings of the invention.

FIG. 1 illustrates an example image identification system constructed in accordance with the teachings of the invention that determines image features, and uses the determined image features to identify images contained in print advertisements, such as, for example, newspapers, magazines, books, etc. To determine (i.e., extract) an image signature for an image, the example system for FIG. 1 contains an Image Feature Extraction Engine (IFEE) 105 that generates image feature vectors. In the illustrated example, an example image feature vector includes a set of numerical values (e.g., F1, F2, . . . F45) that collectively represent one or more characteristic features of the image (e.g., aspect ratio, overall brightness, etc.) and are suitable for identifying the image by comparison against a database of such vectors. Example feature characteristics are discussed below in connection to FIGS. 2-6. Another example image feature vector is a resized version (e.g., a thumbnail image such as a 100 pixels by 100 pixels image) of the original image. However, an image feature vector may include a different number of and/or different types of image features than those described herein.

To store images, image features, image feature vectors, and/or additional information concerning each image (e.g., names of publication, dates of publication, etc. where the image has appeared), the example image identification system of FIG. 1 includes a database 110. An example data structure that may be used to implement the example database 110 is described below in connection with FIG. 12. The example database 110 of FIG. 1 is implemented using a structured query language (SQL) based tool. The example database 110 is stored in any number and/or type(s) of memory(-ies) and/or memory device(s), such as a non-volatile memory device (e.g., a hard disk drive, a compact disc (CD) read-writeable (CD-RW) drive, etc.) contained within, associated with, or connected to a computing platform 150 used to implement, among other things discussed below, the IFEE 105. The example platform 150 of FIG. 1 could be implemented, for example, by a personal computer, a workstation and/or an example processor platform 1100 discussed below in conjunction with FIG. 11.

To compare an image with images already stored in the example database 110, the example image identification system of FIG. 1 includes a database engine (DE) 115. The example database engine 115 of FIG. 1 compares two images (e.g., a newly acquired image and an image stored in the database 110) by computing one or more dissimilarity metrics based on two image feature vectors (e.g., P1 . . . P45 and Q1 . . . Q45) associated with the two images. An example dissimilarity metric is expressed mathematically as shown in EQN. 1, where a smaller resultant value indicates that two images more closely match than two images resulting in a larger metric, where the values of n and m define the range of image features being compared. Additional example dissimilarity metrics are discussed below in connection with FIGS. 2-6.

$$D_{metric}(P, Q) = \sum_{i=n}^{m} |P_i - Q_i| \qquad \text{EQN. 1}$$

As the number of images stored in the example database 110 increases to thousands or millions of images, the time required for the example DE 115 of FIG. 1 to compare a new image to each image stored in the database 110 also increases. To reduce the time required to locate (e.g., identify) one or more images resembling (e.g., matching) the new image, the example DE 115 utilizes a series of indexed tables to implement an efficient binary search algorithm. In particular, each image stored in the example database 110 is characterized and assigned to one or more groups based upon one or more image characteristics (e.g., black and white images, images containing no blue, images containing no green, images containing no blue and no green, color images, etc.). In the illustrated example of FIG. 1, each new image is likewise placed into one or more of the groups. Only those images within the same group(s) are compared with the new image to thereby reduce the search complexity and/or search computation time.

Each of the one or more groups could be split into one or more sub-groups. For example, the images within a group of images could be further categorized based upon edge characteristics (e.g., edge histogram data), normalized average brightness, etc., thus, further reducing the number of images that must be compared to identify each new image. Additionally or alternatively, each new image may be compared exhaustively to each image stored in the database 110, if desired.

As discussed below in connection to FIG. 7, the illustrated example image identification system of FIG. 1 facilitates concurrent a) scanning of images by a human and/or a robotic operator, b) storing (e.g., scanning) of source identifier information (e.g., a newspaper such as the Wall Street Journal) with the new image, and c) comparing of newly scanned images to images stored in the database 110. To facilitate later review of the image comparison results (e.g., after each, some, or all of a batch of new images have been scanned), the example DE 115 of FIG. 1 places the results of the completed comparisons into a cache 120. Example results include a thumbnail and/or low resolution version of the new image, and a thumbnail and/or low resolution version of each possible matching image. The DE 115 could, additionally or alternatively, place and/or store results directly into the database 110 (e.g., if a match between the new image and a stored image can be automatically determined with sufficient confidence, for example, a correlation value that exceeds a threshold) without presenting them to the operator, and/or directly provide them to a user interface 125.

To enable control of the example system of FIG. 1 by a human operator, the example image identification system includes the example user interface 125. The example user interface 125 of FIG. 1 allows a human operator (not shown) to, among other things, review previously cached results. For example, the user interface 125 can display a thumbnail of a new image and thumbnail(s) for each one or more possible matching images from the database 110, and allow the operator to indicate which of the possible image(s) (if any) match the new image. When a match is identified by the operator, the new image is associated with the matching image, associated with the identification information of the matching image, and/or the source information of the new image is associated with the matching image. That is, the example DE 115 updates the record for the matching image stored in the database 110 to associate the source information of the new image (e.g., publication name, date, etc.) with the matching image. When a match is not identified by the operator, the DE 115 creates a new record based on the new image and the source information of the new image in the database 110. When a partial match is identified (e.g., the same product being advertised but with a different price) by the operator, the DE 115 presents an interface that allows the operator to update information associated with the matching image (e.g., updating a product price field). By associating new images and source information with matching images in the database 110, information regarding the occurrence of particular images (e.g., advertisements) in printed sources (e.g., periodicals) can be determined. For example, the example database 110 may develop and store information that represents that a particular advertisement appeared in three different magazines over a six month period.

The example user interface 125 of FIG. 1 may additionally or alternatively be used to allow the operator to interact with the DE 115 to identify and/or retrieve the database record for a particular image of interest; to request an identification of closest matching image(s) to a particular image of interest; to display the closest matching image(s); to update one or more image information fields (e.g., a price) associated with a stored image; to add an image to the database 110; and/or to remove an image from the database 110. The user interface 125 may additionally or alternatively be used to allow the operator to use, control, start, stop, and/or configure a scanner 130.

In the example image identification system of FIG. 1, images stored in the database 110 may be obtained by digitally scanning paper and/or printed images from print advertisements and/or advertisements presented and/or scanned from electronic media such as the Internet. To scan the paper or printed images, the example image identification system includes the example scanner 130 configurable to convert paper and/or electronic images into digital representations of the printed images (e.g., Joint Picture Experts Group (JPEG) files, portable document format (PDF) files, etc.). Thus, each scanned image is digitally represented by a two dimensional matrix of pixels. Additionally or alternatively, images stored in the example database 110 may be provided to the platform 150 directly as digital images. For example, paper images could be scanned remotely from the platform 150, stored on a removable storage medium (e.g., CD-RW), and imported into the example database 110.

While an example image identification system is illustrated in FIG. 1, one or more of the interfaces, data structures, elements, processes and/or devices illustrated in FIG. 1 may be combined, divided, rearranged, omitted, eliminated and/or implemented in any other way. Further, the example IFEE 105, the example database 110, the example DE 115, the example cache 120, the example user interface 125, the example scanner 130 and/or and/or, more generally, the example image identification system may be implemented by hardware, software, firmware and/or any combination of hardware, software and/or firmware. Further still, the example image identification system may include interfaces, data structures, elements, processes and/or devices instead of, or in addition to, those illustrated in FIG. 1 and/or may include more than one of any or all of the illustrated interfaces, data structures, elements, processes and/or devices.

Figure 2:
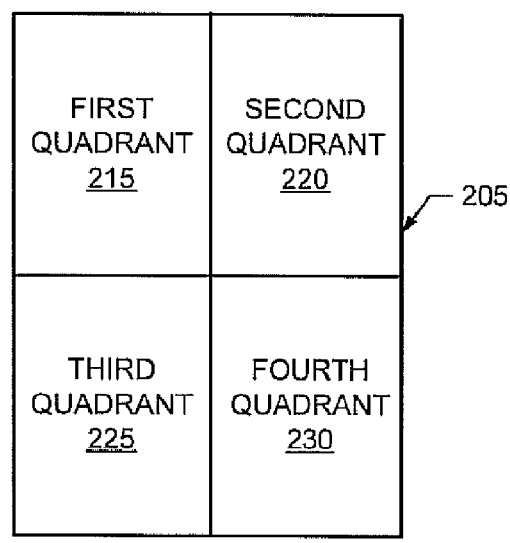
FIG. 2 is an example of portions of an image.

In the example image identification system of FIG. 1, each image 205 is processed (as discussed below) with respect to five portions of the image 205, namely, the entire image 205, a first quadrant 215, a second quadrant 220, a third quadrant 225, and a fourth quadrant 230, as illustrated in FIG. 2. However, any portions, partitions and/or sub-images of an image (e.g., halves, eighths, etc.) may be used to process the image. However, for ease of presentation, the following descriptions utilize images and/or image quadrants.

In the example image identification system of FIG. 1, a first example image feature (e.g., F1) extracted by the example IFEE 105 is the aspect ratio of an image. In particular, F1 represents the ratio (i.e., division) of the height (in pixels) to the width (in pixels) of the image.

Using any algorithm(s), method(s) and/or technique(s), the example IFEE 105 of FIG. 1 then decomposes each image into a set of images (i.e., image components). Each of the images in the set represents a predetermined component (e.g., brightness, blue, yellow, red and/or green).

In the example image identification system of FIG. 1, example image features (e.g., F2, F3, F4, and F5) are the average values of the brightness (e.g., black and white) computed over (a) the entire image 205, (block) over the first quadrant 215, (c) over the second quadrant 220 and (d) over the third quadrant 225, respectively. For instance, F3 may be computed by summing together the numerical values of each pixel contained within the first quadrant 215 of the brightness component of the image 205, and then dividing the sum by the number of pixels in the first quadrant 215. The set of image feature values {F2, F3, F4, F5} are then jointly, commonly and/or collectively normalized such that the maximum of {F2, F3, F4, F5} has a first predetermined value and such that the minimum of {F2, F3, F4, F5} has a second predetermined value. Similarly, further example image features (e.g., F6, F7, F8 and F9) are the average values of the blue, yellow, red and green color components computed over the entire image 205.

Centers of mass and/or centroids may also be calculated, and used to characterize an image. In the illustrated example, to calculate the horizontal (e.g., x-axis) position of a centroid for an image color component, the value of each pixel is multiplied by its column number (e.g., a counted offset from the left side of the image) to create individual moments. The plurality of individual moments are then summed, and the sum is divided by the maximum individual column moment value to provide a normalized horizontal position of the centroid for that image component. Similarly, to calculate the vertical (e.g., y-axis) position of a centroid for an image color component, the value of each pixel is multiplied by its row number (e.g., a counted offset from the top of the image) to create individual moments, the plurality of individual moments are then summed. The sum is then divided by the maximum individual row moment value to provide a normalized vertical position of the centroid for that image component. For example, the normalized horizontal and vertical positions of the centroid for a image component (e.g., a particular color or brightness) "I" can be expressed mathematically as a percentage using EQNS. 2 and 3. In EQNS. 2 and 3, the value "C" is the total number of columns (e.g., the number of horizontal pixels) comprising the image for which the centroid is being calculated, the value "R" is the total number of rows (e.g., the number of vertical pixels), and a value I[r][c] is the value of the pixel at row "r" and column "c" for the component "I" (e.g., Red, Green, Blue, Yellow, brightness, etc.).

$$centroid_x = \frac{100 \sum_{r=0}^{R-1} \sum_{c=0}^{C-1} c * I[r][c]}{C \sum_{r=0}^{R-1} \sum_{c=0}^{C-1} I[r][c]}$$ EQN. 2

$$centroid_y = \frac{100 \sum_{r=0}^{R-1} \sum_{c=0}^{C-1} r * I[r][c]}{R \sum_{r=0}^{R-1} \sum_{c=0}^{C-1} I[r][c]}$$ EQN. 3

Figure 3:
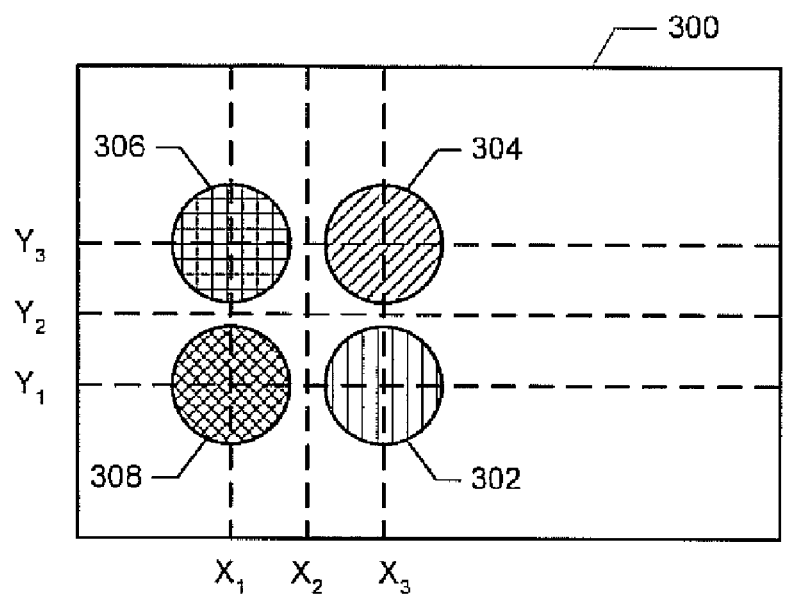
FIG. 3 depicts an example image illustrating an example centroid calculation.

FIG. 3 illustrates an example image 300 for which example centroids can be calculated using the method described above in connection with EQNS. 2 and 3. To clearly illustrate the manner in which centroids are generated using EQNS. 2 and 3, the example image 300 includes four circles 302, 304, 306 and 308, each of which is a pure color within a particular color model. In the illustrated example, the circles 302, 304, 306 and 308 may be red, green, blue and yellow, respectively. In addition, to keep the example of FIG. 3 simple, the colored circles 302-308 are of equal and uniform brightness.

Using EQNS. 2 and 3 above to generate the normalized horizontal and vertical coordinates of the centroid for each of the color components of the example image 300 results in the set of coordinate pairs $(X_1, Y_1)$, $(X_1, Y_3)$, $(X_2, Y_2)$, $(X_3, Y_1)$, and $(X_3, Y_3)$. The pair $(X_1, Y_1)$ is the centroid of the color component associated with the circle 308, $(X_1, Y_3)$ is the centroid of the color component associated with the circle 306, $(X_2, Y_2)$ is the centroid of the brightness associated with the image 300, $(X_3, Y_1)$ is the centroid of the color component associated with the circle 302, and $(X_3, Y_3)$ is the centroid of the color component associated with the circle 304.

In the example image identification system of FIG. 1, sets of coordinate pairs specifying centroid locations within an image are used as additional example image features. In particular, (F10, F11, F12, F13, F14, F15, F16, F17, F18, F19, F20, F21, F22, F23, F24, F25)=$(Y_x, Y_y, Y1_x, Y1_y, Y2_x, Y2_y, Y3_x, Y3_y, Blue_x, Blue_y, Yellow_x, Yellow_y, Red_x, Red_y, Green_x, Green_y)$, where, for example, $Y1_x$ is the horizontal position of the centroid of the brightness component for the first quadrant, $Red_y$ is the vertical position of the centroid of the red component for the entire image, etc.

Figure 4:
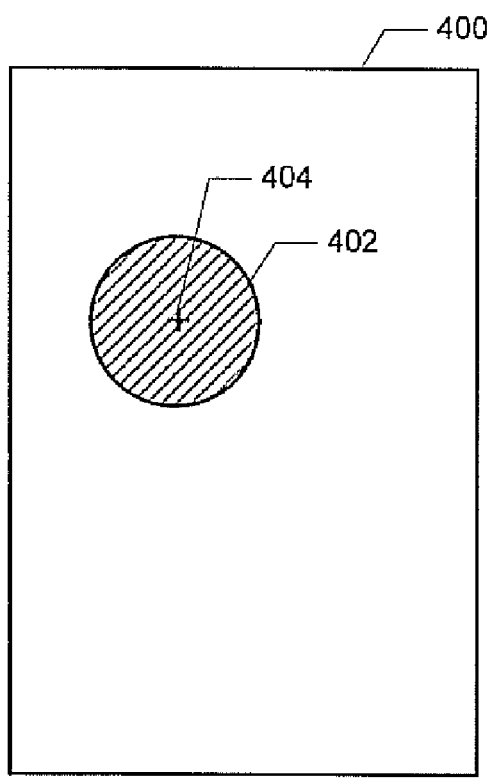
FIG. 4 depicts an example image in which a centroid is surrounded by a pre-determined color.
Figure 5:
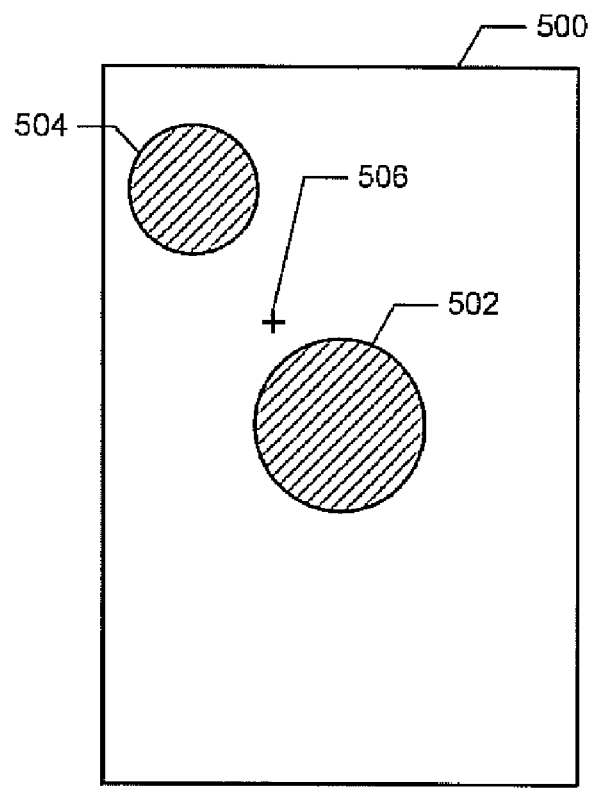
FIG. 5 depicts an example image in which a centroid is not surrounded by a pre-determined color.

Another example image feature characteristic reflects whether a pixel located at the centroid location of an image color component has a pixel value greater than a pre-determined threshold (e.g., zero, 50%, etc.). For example, FIG. 4 depicts an example image 400 containing a single circle 402 of a pure color component (e.g., blue, yellow, red, green, etc.) The example circle 402 has a centroid 404 for the color component located at the "+" at the center of the circle 402. In the example image 400 of FIG. 4, the pixel located at the "+" at the center of the example circle 402 (i.e., at the centroid 404) contains the color component. FIG. 5 depicts an example image 500 having two circles 502 and 504 both of an identical pure color component. A centroid 506 for this color component of the example image 500 is located at the "+" and is located in the same place as the centroid 404 in the example image 400. In the example image 500 of FIG. 5, the pixel located at the example centroid 506 does not contain the color component. Additionally or alternatively, a set of pixels located around and/or near to a centroid could be used instead of the single pixel located at the centroid. That is, instead of or in addition to determining if the centroid contains the color component, the system can determine whether the centroid abuts at least one pixel containing the color component.

In the example image identification system of FIG. 1, an example image feature F42 has a value of one if the pixel at the centroid (F18, F19) contains and/or abuts a pixel of the blue color component having a pixel value exceeding a threshold, and has a value of zero otherwise if the pixel at the centroid (F18, F19) does not contain or abut a pixel of the blue color component having a pixel value less than the threshold. Likewise, an example image feature F43 reflects if the centroid at (F20, F21) contains and/or abuts a pixel of the yellow color component having a pixel value exceeding the threshold, an example image feature F44 reflects if the centroid at (F22, F23) contains and/or abuts a pixel of the red color component having a pixel value exceeding the threshold, and an example image feature F45 reflects if the centroid at (F24, F25) contains and/or abuts a pixel of the green color component having a pixel value exceeding the threshold. The set of example image features (F42 . . . F45) constitute a set of on/off flags.

Edges present in an image may also be used to characterize and/or identify an image. An edge is typically defined as a border between two regions of an image having distinctly different brightnesses and/or color content(s), that is, an edge may be identified as a sufficiently large change in pixel value from one pixel (and/or group of pixels) to an adjacent pixel (and/or group of pixels). Edges may be identified using any technique(s), method(s) and/or algorithm(s). For example, each pixel could be compared to adjacent pixels and, if a difference in pixel value exceeds a pre-determined threshold, the pixel is marked as an edge pixel. The plurality of thus marked pixels constitute one or more edges within the image.

Figure 6:
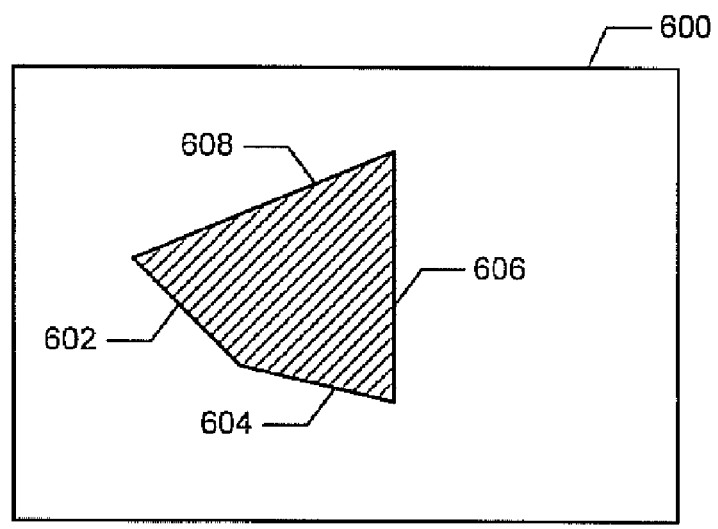
FIG. 6 depicts an example image illustrating an example edge count calculation.

FIG. 6 depicts an example image 600 containing a single region having a pure color component (e.g., blue, yellow, red, green, etc.) defined by a plurality of lines 602, 604, 606 and 608. If each pixel in the example image 600 of FIG. 6 is compared, as described above, to adjacent pixels, then the example lines 602, 604, 606, and 608 will be identified as a plurality of example edges 602, 604, 606 and 608 for the example image 600.

Each of the example edges 602, 604, 606 and 608 for the example image 600 of FIG. 6 can be classified based upon their angle with respect to, for example, the bottom left corner of the example image 600. For example, the example edge 606 is vertical (i.e., 90 degrees), the example edge 608 has an angle of approximately 30 degrees, the example edge 602 has an angle of approximately −60 degrees, and the example edge 604 has an angle of approximately −15 degrees.

In the example image identification system of FIG. 1, the angle of each edge is determined modulus 180 degrees. Thus, the angles of the example edges 602, 604, 606 and 608 of FIG. 6 are 120 degrees, 165 degrees, 90 degrees and 30 degrees, respectively. Further, in the illustrated example, the edges within each of the four quadrants of an image are placed into four groups: Group I—edges having an angle between 67.5 and 112.5 degrees; Group II—edges having an angle between 0 and 22.5 degrees or 157.5 and 180 degrees; Group III—edges having an angle between 22.5 and 67.5 degrees; and Group IV—edges having an angle between 112.5 degrees and 157.5 degrees. Within each quadrant and each group, a count of all edge pixels is computed. Thus, four sets of four edge counts are computed. For example, image features (F26 . . . F29) represent the edge count totals in the first quadrant for Groups I, II, III and IV, respectively. Likewise example image features (F30 . . . F33), (F34 . . . F37) and (F38 . . . F41) contain the edge count totals for the second quadrant, the third quadrant and the fourth quadrant, respectively. Taken collectively, the example image features (F26 . . . F41) represent a histogram of edge characteristics for the image. In the example image identification system of FIG. 1, the edge histogram is normalized by computing a mean of the features (F26 . . . F41) and then subtracting the mean from the features (F26 . . . F41).

TABLE 1 summarizes the example image characterizing features included in the example image feature vector discussed above for the example image identification system of FIG. 1. However, any number and/or type(s) of additional and/or alternative image features may be used to identify and/or compare images. For example, a smaller or larger number of edge groupings could be used, a different color decomposition could be used, a different image partitioning, etc.

TABLE 1

Example Image Feature Vector

| Reference Number | Characterizing Feature |
| --- | --- |
| F1 | Aspect Ratio |
| F2 | Average brightness over entire image |
| F3 | Average brightness over $1^{st}$ quadrant |
| F4 | Average brightness over $2^{nd}$ quadrant |
| F5 | Average brightness over $3^{rd}$ quadrant |
| F6 | Average over entire image for blue component |
| F7 | Average over entire image for yellow component |
| F8 | Average over entire image for red component |
| F9 | Average over entire image for green component |
| (F10, F11) | Coordinates of centroid for brightness component for entire image |
| (F12, F13) | Coordinates of centroid for brightness component for $1^{st}$ quadrant |
| (F14, F15) | Coordinates of centroid for brightness component for $2^{nd}$ quadrant |
| (F16, F17) | Coordinates of centroid for brightness component for $3^{rd}$ quadrant |
| (F18, F19) | Coordinates of centroid for entire image for blue component. |
| (F20, F21) | Coordinates of centroid for entire image for yellow component |
| (F22, F23) | Coordinates of centroid for entire image for red component |
| (F24, F25) | Coordinates of centroid for entire image for green component |
| (F26 . . . F29) | Edge count totals for $1^{st}$ quadrant |
| (F30 . . . F33) | Edge count totals for $2^{nd}$ quadrant |
| (F34 . . . F47) | Edge count totals for $3^{rd}$ quadrant |
| (F38 . . . F41) | Edge count totals for $4^{th}$ quadrant |
| F42 | On/Off flag for blue component |
| F43 | On/Off flag for yellow component |
| F44 | On/Off flag for red component |
| F45 | On/Off flag for green component |

As discussed above, the example database engine 115 of FIG. 1 compares two images by computing one or more dissimilarity metrics based on the two image feature vectors associated with the two images. A dissimilarity metric reflects a relative distance and/or difference between the two image feature vectors. In particular, the less two images resemble each other, the bigger the value of the dissimilarity metric. Further, if two images are substantially identical, the dissimilarity metric will have a value that is substantially zero.

In the example image identification system of FIG. 1, six example dissimilarity metrics are used to compare images: $D_r$ that reflects a difference in aspect ratio, $D_{avg}$ that reflects a difference in average brightness, $D_{color}$ that reflects a difference in color content, $D_{centroid}$ that reflects a difference in centroid locations, $D_{edge}$ that reflects a difference in normalized edge histograms, and $D_{config}$ that reflects a difference in configuration (i.e., on/off flags). EQNS. 4-9 illustrate example mathematical expressions for each of the six example dissimilarity metrics, respectively, based on the forty-five example image features discussed above, where [P1 . . . P45] and [Q1 . . . Q45] are the image features for two images being compared.

$$D_r(P, Q) = |P_1 - Q_1| \qquad \text{EQN. 4}$$

$$D_{avg}(P, Q) = \sum_{i=2}^{5} |P_i - Q_i| \qquad \text{EQN. 5}$$

-continued $$D_{color}(P, Q) = \sum_{i=6}^{9} |P_i - Q_i|$$ EQN. 6

$$D_{centroid}(P, Q) = \sum_{i=10}^{25} |P_i - Q_i|$$ EQN. 7

$$D_{edge}(P, Q) = \sum_{i=26}^{41} |P_i - Q_i|$$ EQN. 8

$$D_{config}(P, Q) = \sum_{i=42}^{45} |P_i - Q_i|$$ EQN. 9

An overall dissimilarity measure that reflects the overall similarity (and/or dissimilarity) of two images can be constructed by combining the example dissimilarity metrics of EQNS. 4-9. For example, EQN. 10 is a mathematical expression of a dissimilarity measure formed as a weighted linear combination of the example dissimilarity metrics of EQNS. 4-9, where $w_1$, $w_2$, $w_3$, $w_4$, $w_5$ and $w_6$ are weights that reflect the relative importance of the various example image characteristics discussed above. For example, if $w_1$ is set to zero, the comparison will be invariant to the aspect ratio of the two images.

$$D(P, Q) = \frac{\begin{bmatrix} w_1 \cdot D_r(P, Q) + w_2 \cdot D_{avg}(P, Q) + \\ w_3 \cdot D_{color}(P, Q) + w_4 \cdot D_{centroid}(P, Q) + \\ w_5 \cdot D_{edge}(P, Q) + w_6 \cdot D_{config}(P, Q) \end{bmatrix}}{\sum_{i=1}^{6} w_i}$$ EQN. 10

The number and type(s) of dissimilarity metrics used could be different from that discussed above. For example, a dissimilarity metric could utilize a mean of a sum of squared differences. Further, dissimilarity metrics may be combined in other ways. For example, they could be combined without using weights, by using a non-linear combination of the dissimilarity metrics, by multiplying the dissimilarity metrics with each other, etc.

When the example dissimilarity measure of EQN. 10 is compared to a threshold to identify potential matching images, non-matching images may be incorrectly identified as matching. To substantially eliminate such non-matching images, the example database engine 115 of FIG. 1 compares the new image with each of the images identified by the dissimilarity measure of EQN. 10 using a larger image feature vector (e.g., resized 100 pixel by 100 pixel versions of the images) than that used to compute the example dissimilarity measure of EQN. 10. The database engine 115 compares the images by computing a correlation of the larger image feature vectors. However, other methods of comparing the larger image feature vectors may be used. By using larger image feature vectors, the chances of falsely identifying matching images are substantially reduced. However, by using the dissimilarity measure of EQN. 10 to select the set of images to which the larger image feature vectors are compared, the overall speed and computational efficiency of the database engine 115 is improved.

Figure 7:
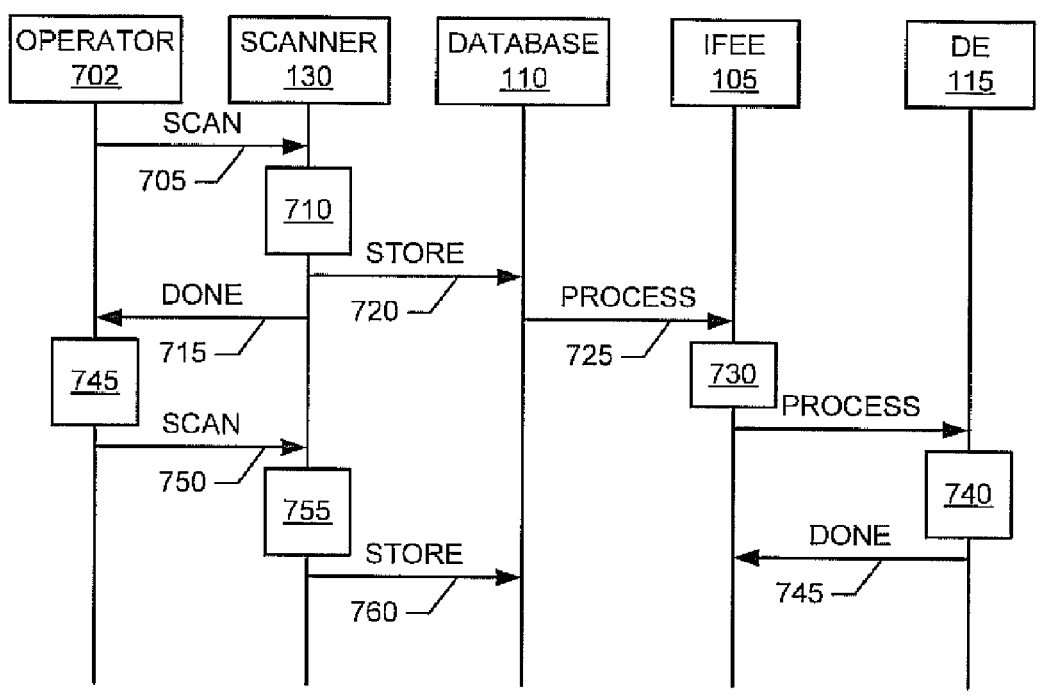
FIG. 7 depicts example operations of the example image identification system of FIG. 1.

FIG. 7 depicts example operations of the example image identification system of FIG. 1. The example operations of FIG. 7 begin with an operator 702 of the example image identification system of FIG. 1 initiating a scan via the user interface 125 (line 705). In response to the scan initiation (line 705), the scanner 130 scans the image (block 710), and stores the scanned image in the example database 110 (line 720). In some examples, the operator 702 stores and/or provides to the database 110 printed-media information for the scanned image. For example, before commencing the scan of a sequence of images from a particular printed media, the operator 702 provides the printed-media source information for the next set of images (e.g., by scanning a front page and/or cover page of the printed media). With each image, the operator 702 then needs only provide a page number for the scanned image. Alternatively, the IFEE 105 could automatically extract the page number from the scanned image.

The example IFEE 105 is notified that a new image is available in the database 110 (line 725), and processes the new image to extract image features (block 730). Once the IFEE 105 is done processing the image (block 730), the example DE 115 compares the new image, as discussed above, with some or all of the images stored in the database 110 (block 740), places the results into the example cache 120 (block 740), and notifies the example IFEE 105 that the DE 115 is done processing (block 745) the new image.

In parallel with the processing (block 730) and the comparing (block 740), the operator 702 places a second new image on the scanner 130 (block 745) and initiates a second scan (line 750). The scanner 130 scans the second new image (block 755) and stores the scanned second new image in the database 110 (line 760).

As illustrated in FIG. 7, the actions of the operator 702 and the scanner 130 (e.g., placing (block 745) and scanning (block 755)) can occur concurrently to the processing (block 730) and comparing (block 740) of the scanned image performed by the IFEE 105 and the DE 115, respectively. This concurrency results in high efficiency and throughput for the example image identification system of FIG. 1.

Figure 8:
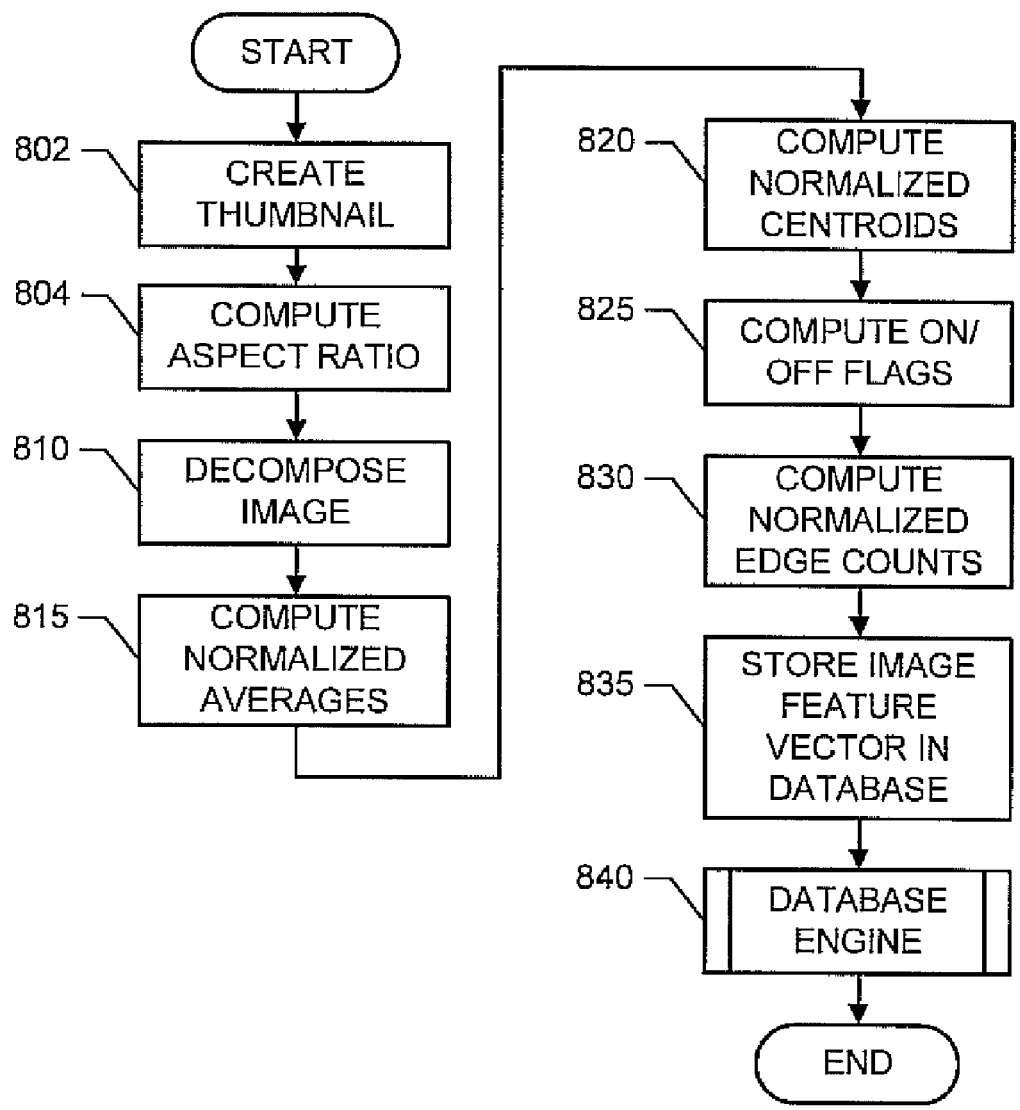
FIG. 8 is a flowchart representative of example machine accessible instructions which may be executed to implement the example Image Feature Extraction Engine (IFEE) of FIG. 1.
Figure 9:
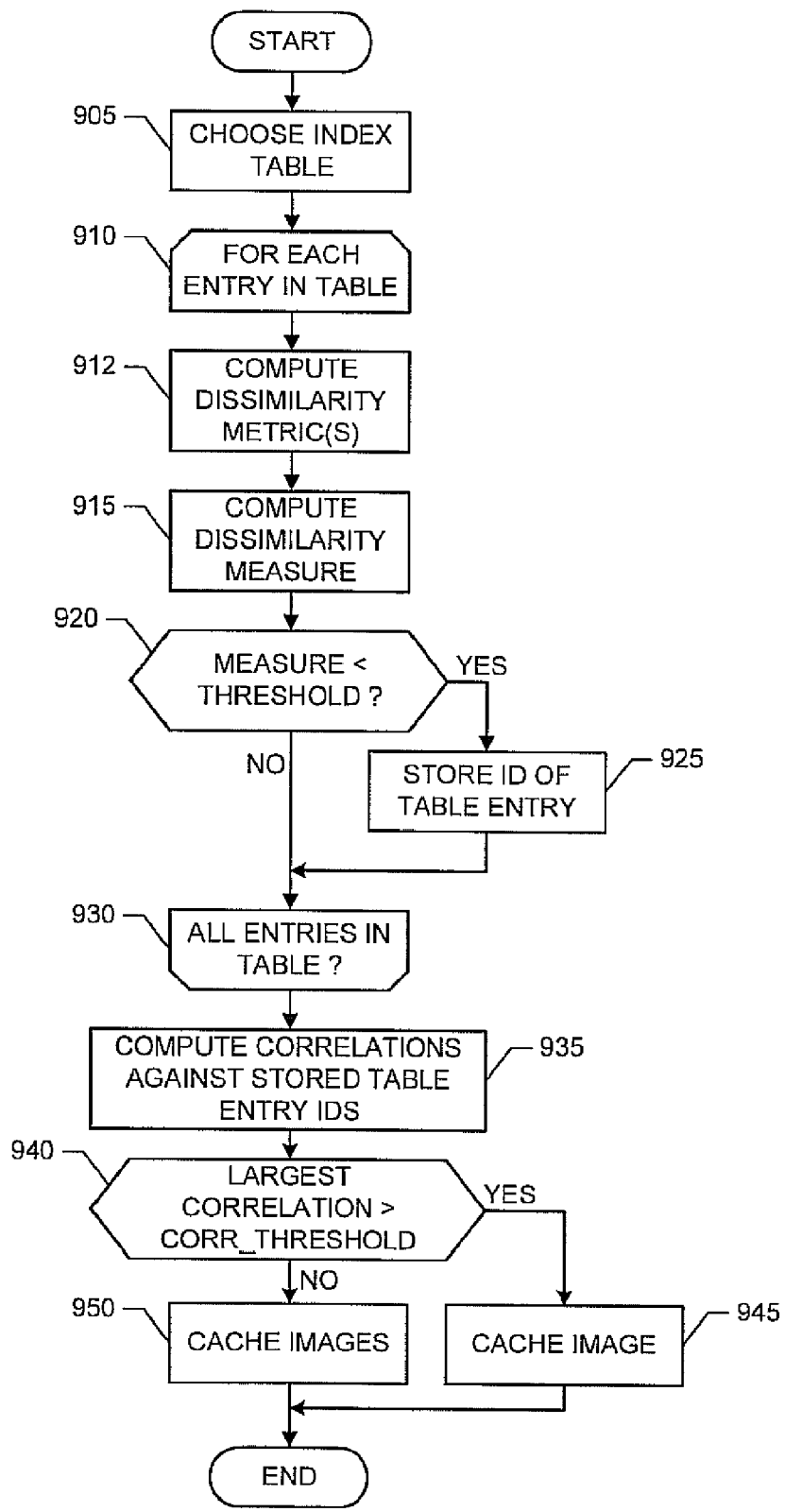
FIG. 9 is a flowchart representative of example machine accessible instructions which may be executed to implement the example database engine of FIG. 1.
Figure 10:
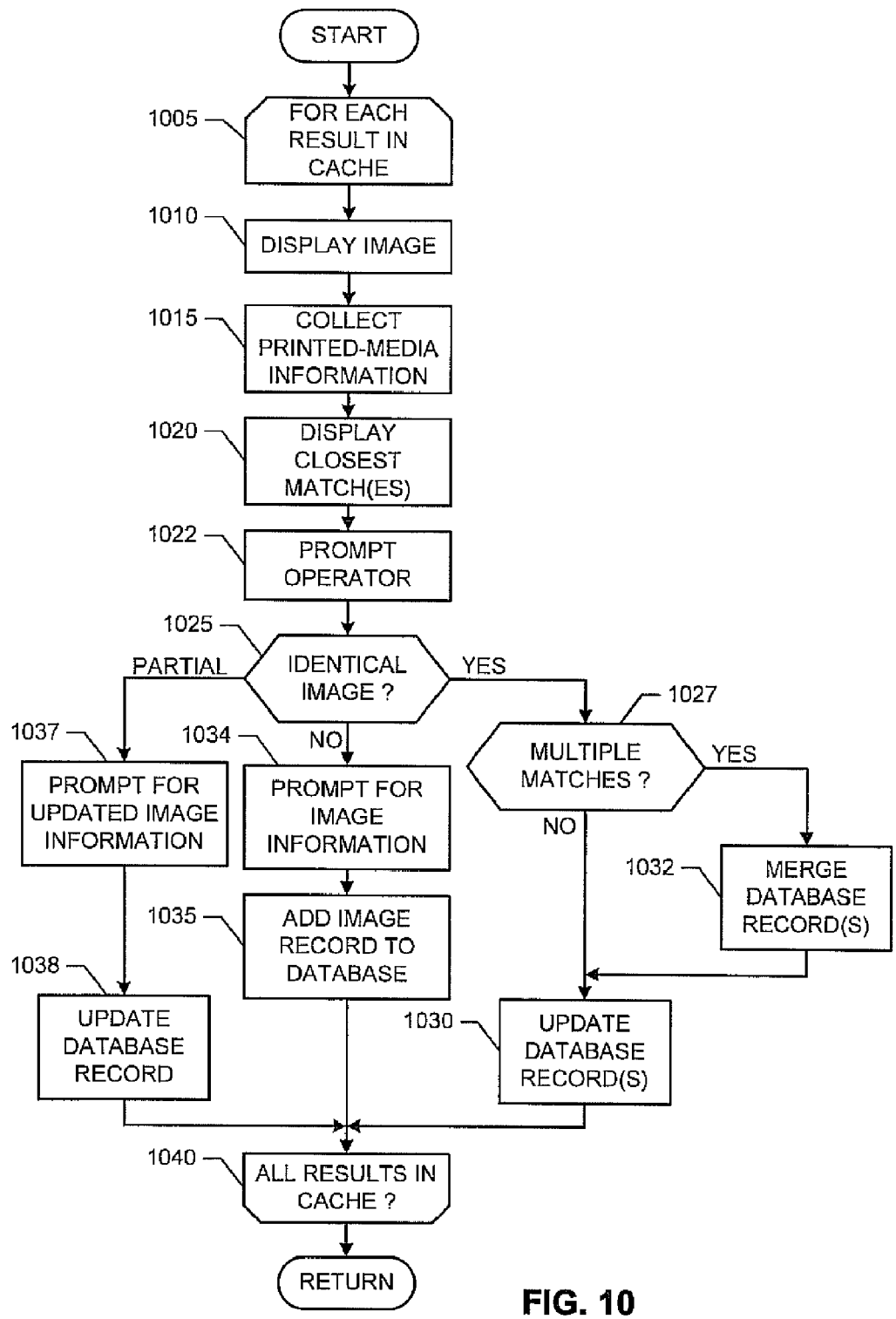
FIG. 10 is a flowchart representative of example machine accessible instructions which may be executed to implement the example image identification system of FIG. 1.

FIGS. 8, 9 and 10 illustrate example machine accessible instructions that may be executed to implement the example IFEE 105, the example DE 115, the example user interface 125 and/or the example platform 150, all of FIG. 1. The machine accessible instructions of FIGS. 8-10 may be carried out by a processor, a controller and/or any other suitable processing device. For example, any or all of the machine accessible instructions of FIGS. 8-10, the IFEE 105, the DE 115, the user interface 125 and/or the platform 150 may be embodied in coded instructions stored on a tangible medium such as a flash memory, read-only memory (ROM) and/or random-access memory (RAM) associated with a processor (e.g., the example processor 1110 discussed below in conjunction with FIG. 11). Alternatively, some or all of the example machine accessible instructions of FIGS. 8-10, the IFEE 105, the DE 115, the user interface 125 and/or the platform 150 may be implemented using any combination of application specific integrated circuit(s) (ASIC(s)), programmable logic device(s) (PLD(s)), field programmable logic device(s) (FPLD(s)), discrete logic, hardware, firmware, etc. Also, some or all of the machine accessible instructions of FIGS. 8-10, the IFEE 105, the DE 115, the user interface 125 and/or the platform 150 may be implemented manually or as any combination of any of the foregoing techniques, for example, any combination of firmware, software, discrete logic and/or hardware. Further, although the example machine accessible instructions of FIGS. 8-10 are described with reference to the flowcharts of FIG. 8-10, persons of ordinary skill in the art will readily appreciate that many other methods of implementing the IFEE 105, the DE 115, the user interface 125 and/or the platform 150 may be employed. For example, the order of execution of the blocks may be changed, and/or one or more of the blocks described may be changed, eliminated, sub-divided, and/or combined. Additionally, persons of ordinary skill in the art will appreciate that any or all of the example machine accessible instructions of FIGS. 8-10 may be carried out sequentially and/or carried out in parallel by, for example, separate processing threads, processors, devices, discrete logic, circuits, etc.

The example machine accessible instructions of FIG. 8 begin when a new image is scanned by, for example, the example scanner 130 of FIG. 1, and stored in a database (e.g., the example database 110). The example machine accessible instructions of FIG. 8 may additionally or alternatively begin in response to a request from an operator to process a specific image previously stored in the database 110. An IFEE (e.g., the example IFEE 105 of FIG. 1) creates a thumbnail (i.e., low resolution version) of the new image (block 802), and computes the aspect ratio of the new image (e.g., F1) (block 804).

The IFEE then decomposes the image into a plurality of portions and/or sub-images (e.g., quadrant) and components (e.g., based on brightness, blue, yellow, red and green) (block 810). As discussed above, the IFEE then computes the average brightness values for the image portions (e.g., F2 ... F5) and the average color values (e.g., F6 ... F9) for these components (block 815).

Next, the IFEE computes the coordinates for a plurality of centroids for the quadrants in the plurality of components (e.g., F10 ... F25) (block 820), and computes the on/off flags discussed above (e.g., F42 ... F45) (block 825). The IFEE then identifies the edges in each quadrant of the image and computes the normalized edge counts (e.g., F26 ... F41) (block 830). The IFEE then stores the extracted image feature vectors (e.g., F1 ... F45) in the database 110 (block 835).

Finally, an image identification system (e.g., the example image identification system of FIG. 1) compares the new image with other images stored in the database by, for example, executing the example machine accessible instructions of FIG. 9 (block 840). Upon completion of the example machine accessible instructions of FIG. 9 (block 840), control exits from the example machine accessible instructions of FIG. 8.

The example machine accessible instructions of FIG. 9 begin after an image feature vector (e.g., F1 ... F45) has been extracted for an image by, for example, executing blocks 802, 804, 810, 815, 820, 825, 830 and 835 of the example machine accessible instructions of FIG. 8. Based upon a portion of the image feature vector (e.g., black and white vs. color, no blue component, etc.), a database engine (e.g., the example DE 115 of FIG. 1) chooses an index table that specifies a subset of the images stored in a database (e.g., the example database 110) (block 905). For each of the images in the subset of images (block 910), the DE computes one or more dissimilarity metrics between the new image and an image from the subset of images (block 912). The DE then computes an overall dissimilarity measure based on the one or more dissimilarity metrics (block 915). If the dissimilarity measure is less than a threshold (block 920), the DE notes (e.g., records) the identification of the image from the subset of images (block 925).

If not all of the images in the subset of the images have been processed (block 935), control returns to block 910 to process the next image in the subset of images. If all of the images in the subset of the images have been processed (block 930), the DE computes a correlation of the image to each of the images identified at block 925 (block 935). The DE computes the correlations using a larger image feature vector (e.g., a resized version of the images) than the image feature vector used to compute the dissimilarity metrics at block 912 and/or the dissimilarity measure at block 915. If the largest of the computed correlation value is greater than a correlation decision threshold (e.g., a matching image can be automatically determined with high confidence by the DE) (block 940), the DE stores the identification of the image associated with the largest correlation value in a cache (e.g., the example cache 120 of FIG. 1) and/or stores the identification of the image associated with the largest correlation value directly into a database (e.g., the example database 110) (block 945). Control then exits from the example machine accessible instructions of FIG. 9.

If the largest correlation value is not greater than a correlation decision threshold (block 940), the DE stores the identification of the images identified at block 925 in the cache (block 950). Alternatively, the DE only stores the identification of the most likely images (e.g., the three images having the largest correlation values). Control then exits from the example machine accessible instructions of FIG. 9.

The choosing of an index table (block 905) could include the choosing of a sub-index table if the images stored in the database 110 are further partitioned. For example, within black and white images, the image could be further partitioned based upon normalized average brightness of entire image (F2). If a sub-index table is used, only those images in the sub-index table are compared with the new image in blocks 915, 920, 925 and 930.

The example machine accessible instructions of FIG. 10 begin after one or more images have been scanned and processed by an IFEE and a DE (e.g., the example IFEE 105 and the example DE 115 of FIG. 1). For example, an image may be processed in accordance with the machine accessible instructions of FIGS. 8 and 9. For each result in the cache (e.g., the example cache 120) (block 1005), the image identification system displays the thumbnail for the new image (block 1010), and collects printed-media information (e.g., publication name, publication title, publication date, publisher, page number, etc.) by a) extracting data from a digitized cover, front and/or back page of a printed media, and/or b) prompting the operator to provide the printed-media information (block 1015). Additionally or alternatively, the printed-media information may have been collected and/or obtained when the new image was scanned and/or received.

The image identification system then displays the thumbnail(s) for the closest matching image(s) (block 1020). If more than one possible match is identified by the DE, the image identification system displays a thumbnail for each of the possible matches (block 1020). The DE displays the possible matches in a sorted order based on their correlation values. Additionally or alternatively, if the new image substantially matches a stored image (e.g., a correlation value computed based on the images exceeds a first threshold, and/or a dissimilarity metric computed based on the images is less than a second threshold), the image identification system may automatically associate the new image with the stored image without involvement of the operator (e.g., blocks 1010 through 1040 need not be carried out). For example, if the image identification system obtained the printed-media information at the time that the new image was scanned, the image identification system can automatically associate the printed-media information of the new image with the stored image.

The image identification system then prompts the operator to review the results and to indicate if any of the identified images match the new image (block 1022). If the operator indicates that at least one of the identified images match the new image (block 1025), the image identification system determines if more than one image matches (block 1027). If only one image matches the new image (block 1027), the image identification system updates the record in the database for the image to include the collected printed-media information for the image (e.g., by one of the example printed-media information fields 1225 and 1230 of FIG. 12) (block 1030).

Returning to block 1027, if more than one image matches, the image identification system merges the records for the more than one image in the database (block 1032) and updates the merged record to include additional printed-media information collected for the image (block 1030). For example, more than one image in the database might match the new image (block 1027) if a previous error was made in identifying matching images such that two or more matching images were separately stored in the database.

Returning to block 1025, if the operator indicates that none of the identified images match, the image identification system prompts the operator for image identification information (e.g., advertiser name, company name, product name, product version, type of product, page size, image size, page location, product price, sale price, etc.) for the image (block 1034). The image identification system then creates a new database record (e.g., the example database record of FIG. 12) in the database for the new image that includes the collected image information (e.g., in the example image information field 1215) and the collected printed-media information (e.g., in the example printed-media information field 1225) (block 1035).

Returning to block 1025, if the operator indicates the new image partially matches one of the identified images matches (e.g., the same image but with a different advertised price), the image identification system prompts the operator for updated image identification information (e.g., advertiser name, company name, product name, product version, type of product, etc.) for the image (block 1037). The image identification system then updates the database record with the updated image identification information and with the printed-media information associated with the new image (block 1038). If not all results in the cache have been reviewed (block 1040), control returns to block 1005 to process the next result. If all results have been reviewed (block 1040), control exits from the example machine accessible instructions of FIG. 10.

Figure 11:
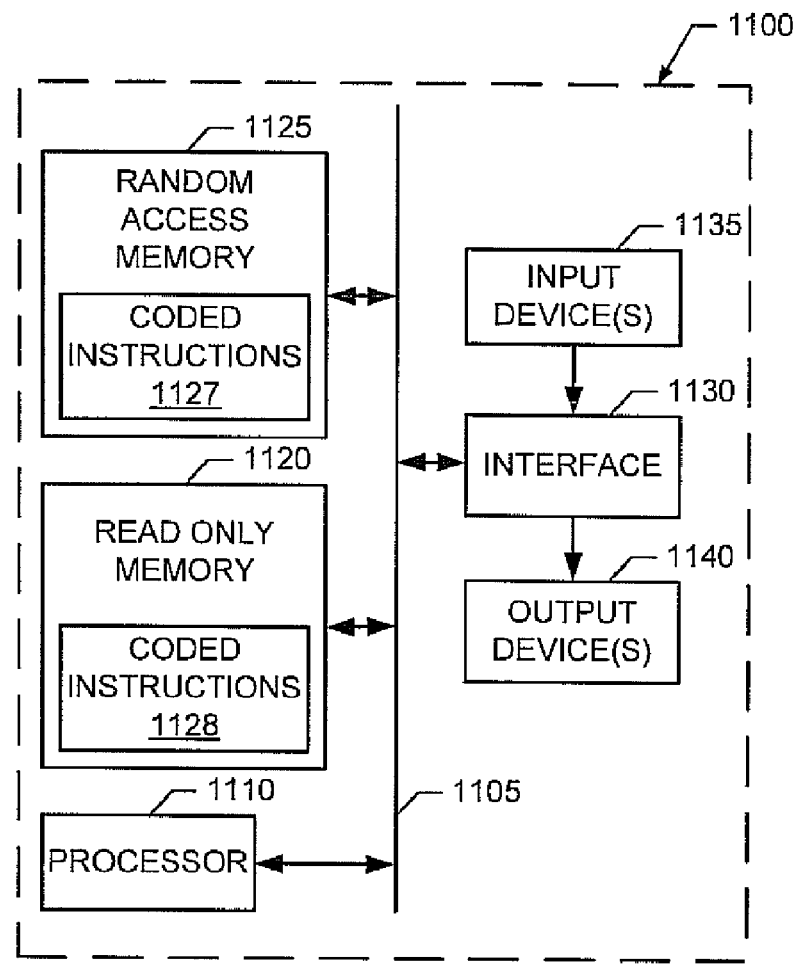
FIG. 11 is a schematic illustration of an example processor platform that may execute the example operations illustrated in FIG. 7 and/or the machine accessible instructions of FIGS. 8, 9 and/or 10 to implement the example image identification system of FIG. 1.

FIG. 11 is a schematic diagram of an example processor platform 1100 capable of executing the example operations illustrated in FIG. 7 and/or the example machine accessible instructions of FIGS. 8-10 to implement the IFEE 105, the DE 115, the user interface 125, the platform 150 and/or the example image identification system of FIG. 1. For example, the processor platform 1100 can be implemented by one or more general purpose microprocessors, microcontrollers, etc.

The processor platform 1100 of the example of FIG. 11 includes at least one general purpose programmable processor 1110. The processor 1110 executes coded instructions 1127 and/or 1128 present in main memory of the processor 1110 (e.g., within a ROM 1120 and/or a RAM 1125). The processor 1110 may be any type of processing unit, such as a processor core, a processor, and/or a microcontroller. The processor 1110 may execute, among other things, the IFEE 105, the example operations of FIG. 7 and/or the example machine accessible instructions of FIGS. 8-10 to implement the methods and apparatus described herein.

The processor 1110 is in communication with the main memory (including a ROM 1120 and the RAM 1125) via a bus 1105. The RAM 1125 may be implemented by Synchronous Dynamic Random Access Memory (SDRAM), Dynamic DRAM, and/or any other type of RAM device. The ROM 1120 may be implemented by flash memory and/or any other desired type of memory device. Access to the memory 1120 and 1125 is typically controlled by a memory controller (not shown). The memory 1120 and/or 1125 may be used to implement the example database 110 and/or the example cache 120 of FIG. 1.

The processor platform 1100 also includes a conventional interface circuit 1130. The interface circuit 1130 may be implemented by any type of interface standard, such as an external memory interface, serial port, general purpose input/output, etc. One or more input devices 1135 and one or more output devices 1140 are connected to the interface circuit 1130. The input devices 1135 and output devices 1140 may be used to implement interfaces between an operator and the example user interface 125, between the example scanner 130 and the example platform 150, between the example scanner 130 and the example user interface 125, and/or between the example scanner 130 and the example database 110.

Figure 12:
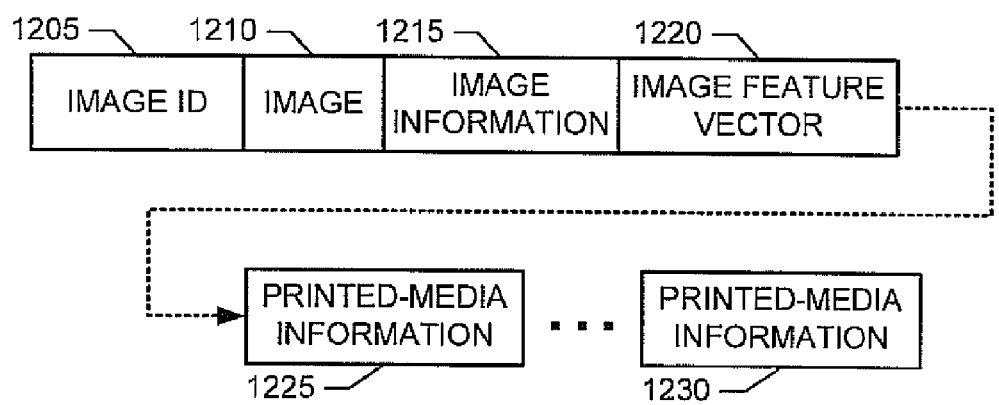
FIG. 12 illustrates an example data structure that may be used to implement the example database of FIG. 1.

FIG. 12 illustrates an example data structure that may be used to implement a database record for the example database 110 of FIG. 1. The example database record of FIG. 12 contains data and/or information associated with a particular image. The example database 110 of FIG. 1 contains one or more of the example database records of FIG. 11 corresponding to one or more images.

To identify an image, the example database record of FIG. 12 includes an image identifier (ID) field 1205. The example image ID field 1205 of FIG. 12 contains a number and/or an alphanumeric string that uniquely identifies a particular image. To store the image, the example database record of FIG. 12 includes an image field 1210. The example image field 1210 of FIG. 12 contains a digital representation of an image (e.g., constructed in accordance with the joint pictographic experts group (JPEG) and/or the tagged information filed format (TIFF) file formats).

To further identify the image, the example database record of FIG. 12 includes an image information field 1215. The example image information field 1215 of FIG. 12 contains one or more alphanumeric strings and/or sub-fields that represent one or more attributes associated with the image such as, for example, advertiser name, company name, product name, product version, product type, page size, page location, image size, product price, sale price, etc.

To store an image feature vector, the example database record of FIG. 12 includes an image feature vector field 1220. The example image feature vector field 1220 of FIG. 12 contains one or more numeric values and/or flags that represent the various components of an image feature vector. The image feature vector field 1220 of the illustrated example contains the image features described above and summarized in Table 1.

To store printed-media source information, the example database record of FIG. 12 includes one or more printed-media information fields, two of which are designated at reference numerals 1225 and 1230. Each of the example printed-media information fields 1225 and 1230 of FIG. 12 contain printed-media information associated with an occurrence of the image in a particular printed media (e.g., identifying a publication such as People Magazine in which the image appeared). Thus, an additional printed-media information field is added to the database record when another occurrence of the image is identified. The example printed-media information fields 1225 and 1230 contains one or more alphanumeric strings and/or sub-fields that represent one or more attributes associated with the printed media in which the image occurred such as, for example, publication name, publication type, publication date, page number, etc.

While an example database record is illustrated in FIG. 12, the example database records may be implemented using any number and/or type(s) of other and/or additional fields and/or data. Further, the fields and/or data illustrated in FIG. 12 may be combined, divided, rearranged, eliminated and/or implemented in any desired manner. Moreover, the example database record may include fields and/or data in addition to, or instead of, those illustrated in FIG. 12, and/or may include more than one of any or all of the illustrated fields and/or data.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   locating a plurality of edges in a first image from a first page of a first physical periodical or a first physical book;
   grouping the plurality of edges into a plurality of groups based on angles of the plurality of edges relative to a reference point, the plurality of groups including a first group associated with a first range of angles;
   determining a number of edges in the first group;
   computing, using a processor, a first image feature vector comprising (1) a first aspect ratio representing a first ratio of a first height to a first width of the first image, and (2) the determined number of edges in the first group;
   performing a first comparison of the first image feature vector to a second image feature vector stored in a database, the second image feature vector comprising (1) a second aspect ratio representing a second ratio of a second height to a second width of a second image, and (2) a number of edges in the second image associated with the first range of angles;
   identifying if the first image feature vector substantially matches the second image feature vector based on the first comparison; and
   updating a database record stored in the database for the second image with printed media information associated with the occurrence of the second image in the first physical periodical or the first physical book when the first image feature vector is identified as substantially matching the second image feature vector.

2. The method of claim 1, wherein the printed media information comprises source information of the first image.

3. The method of claim 1, wherein identifying if the first image feature vector substantially matches the second image feature vector comprises:
   calculating a dissimilarity metric between the first image feature vector and the second image feature vector; and
   comparing the dissimilarity metric to a threshold.

4. The method of claim 3, wherein the dissimilarity metric comprises a plurality of dissimilarity metrics corresponding to a plurality of image features of the first image feature vector.

5. The method of claim 4, wherein the plurality of dissimilarity metrics are weighted.

6. The method of claim 1 further comprising:
   computing a third image feature vector by calculating a third aspect ratio representing a third ratio of a third height to a third width of a third image, the third image scanned from a second page of a second physical periodical or a second physical book; and
   performing a second comparison of the third image feature vector to the second image feature vector.

7. The method of claim 6 further comprising determining a number of times the second image appears in at least one of the first physical periodical, the first physical book, the second physical periodical or the second physical book based on the first comparison and the second comparison.

8. The method of claim 1, wherein computing the first image feature vector further comprises calculating an average brightness over at least a portion of the first image.

9. The method of claim 1, wherein computing the first image feature vector further comprises calculating a color average over at least a portion of the first image.

10. The method of claim 1, wherein computing the first image feature vector further comprises calculating a centroid coordinate for a color component over at least a portion of the first image.

11. A method comprising:
    locating a plurality of edges in a first image from a first page of a first physical periodical or a first physical book;
    grouping the plurality of edges into a plurality of groups based on angles of the plurality of edges relative to a reference point, the plurality of groups including a first group associated with a first range of angles;
    determining a number of edges in the first group;
    calculating a first centroid coordinate for a color component over at least a portion of the first image;
    comparing a first pixel color value of a first pixel at the centroid coordinate to a threshold and a second pixel color value of a second pixel near the centroid to the threshold to determine if at least one of the first pixel color value or the second color value meets the threshold;
    computing, using a processor, a first image feature vector comprising (1) a first aspect ratio representing a first ratio of a first height to a first width of the first image, (2) the determined number of edges in the first group and (3) the determination of at least one of (A) the first pixel color value meeting the threshold or (B) the second pixel color value meeting the threshold; and
    comparing the first image feature vector to a second image feature vector stored in a database, the second image feature vector comprising (1) a second aspect ratio representing a second ratio of a second height to a second width of a second image, (2) a number of edges in the second image associated with the first range of angles, and (3) a determination of at least one of (A) a third pixel color value of a third pixel at a second centroid coordinate for the color component over at least a portion of the second image meeting the threshold or (B) a fourth pixel color value of a fourth pixel near the second centroid meeting the threshold.

12. The method of claim 1, wherein the first height and the first width are measured in pixels.

13. A system comprising:
    an image feature extraction engine to compute:
      a first image feature vector, the first image feature vector including a first aspect ratio representing a first ratio of a first height to a first width of a first image from a first physical periodical or a first physical book; and
      a second image feature vector, the second image feature vector including a second aspect ratio representing a second ratio of a second height to a second width of a second image from the first physical periodical or the first physical book;
    a database to store a third image feature vector corresponding to a third image, the third image feature vector comprising a third aspect ratio representing a third ratio of a third height to a third width of the third image; and a database engine to:
perform a first comparison of the first image feature vector and the third image feature vector to identify if the first image substantially matches the third image;
update a database record stored in the database for the third image with first printed media information associated with the occurrence of the third image in the first physical periodical or the first physical book when the first image is identified as substantially matching the third image;
perform a second comparison of the second image feature vector and the third image feature vector to identify if the second image substantially matches the third image;
update the database record with second printed media information associated with the occurrence of the third image in the first physical periodical or the first physical book when the second image is identified as substantially matching the third image; and
determine a number of times the third image appears in the first physical periodical or the first physical book based on the database record.

14. The system of claim 13, wherein the database engine is to:
compute a dissimilarity metric between the first image feature vector and the third image feature vector; and
identify the first image feature vector as substantially matching the third image feature vector when the dissimilarity metric satisfies a threshold.

15. The system of claim 13, wherein the image feature extraction engine is to compute a fourth image feature vector based on a fourth aspect ratio representing a fourth ratio of a fourth height to a fourth width of a fourth image scanned from a second physical periodical or second physical book; and
the database engine is to perform a third comparison of the fourth image feature vector to the third image feature vector.

16. The system of claim 13, wherein the first image feature vector further comprises an average brightness over at least a portion of the first image.

17. The system of claim 13, wherein the first image feature vector further comprises a color average over at least a portion of the first image.

18. The system of claim 13, wherein the first image feature vector further comprises a centroid coordinate for a color component over at least a portion of the first image.

19. The system of claim 18, wherein the image feature extraction engine is to further compute the first image feature vector by comparing a first pixel color value of a first pixel at the centroid coordinate to a threshold and comparing a second pixel color value of a second pixel near the centroid coordinate to the threshold.

20. The system of claim 13, wherein the image feature extraction engine is to further compute the first image feature vector by:
determining a number of edges over at least a portion of the first image;
grouping the edges based on angle relative to a reference point; and
determining the number of edges in respective groups in at least a portion of the first image.

21. A tangible machine accessible storage device or storage disc comprising instructions that, when executed, cause a machine to at least:
compute a first image feature vector based on a characteristic of a first image scanned from a page of a physical periodical or a physical book, the first image feature vector comprising a first plurality of image features including a first aspect ratio representing a first ratio of a first height to a first width of the first image;
perform a first comparison of the first image feature vector to a second image feature vector for a second image stored in a database, the second image feature vector comprising a second plurality of image features including a second aspect ratio representing a second ratio of a second height to a second width of the second image, the first comparison comprising a calculation of a plurality of dissimilarity metrics between the respective first plurality of image features of the first image feature vector and the second plurality of image features of the second image feature vector;
weight a first calculated dissimilarity metric of a first one of the first and second plurality of image features using a first weight;
weight a second calculated dissimilarity metric of a second one of the first and second plurality of image features using a second weight, the second weight different than the first weight;
determine an overall dissimilarity metric based on the weighted first dissimilarity metric and the weighted second dissimilarity metric;
compare the overall dissimilarity metric to a threshold;
perform a second comparison based on the overall dissimilarity metric meeting the threshold, the second comparison comprising:
(1) computing a third image feature vector for the first image, the third image feature vector being larger than the first image feature vector;
(2) computing a fourth image feature vector for the second image, the fourth image feature vector being larger than the second image feature vector; and
(3) comparing the third image feature vector and the fourth image feature vector to identify if the third image feature vector substantially matches the fourth image feature vector; and
identify that the first image substantially matches the second image based on (1) the overall dissimilarity metric meeting the threshold and (2) the third image feature vector substantially matching the fourth image feature vector.

22. The tangible machine accessible storage device or storage disc of claim 21, wherein the first plurality of image features include an average brightness over at least a portion of the first image.

23. The tangible machine accessible storage device or storage disc of claim 21, wherein the first plurality of image features include a color average over at least a portion of the first image.

24. The tangible machine accessible storage device or storage disc of claim 21, wherein the first plurality of image features include a centroid coordinate for a color component over at least a portion of the first image.

25. The tangible machine accessible storage device or storage disc of claim 24, wherein the instructions further cause the machine to compute the first image feature vector by:
comparing a first pixel color value of a first pixel at the centroid coordinate to a threshold; and
comparing a second pixel color value of a second pixel near the centroid coordinate to the threshold.

26. The tangible machine accessible storage device or storage disc of claim 21, wherein the instructions further cause the machine to compute the first image feature vector by:
determining a number of edges in at least a portion of the first image;

grouping the edges based on angle relative to a reference point; and determining the number of edges in respective groups in the at least a portion of the first image.

27. The method of claim 1 further comprising compiling a list of occurrences in which images substantially matching the second image feature vector were printed based on the database record.

28. The tangible machine accessible storage device or storage disc of claim 21, wherein the third image feature vector is based on a version of the first image having more pixels than the a version of the first image for which the first image feature vector is based.

* * * * *